(12) United States Patent
Hoelen et al.

(10) Patent No.: US 8,310,144 B2
(45) Date of Patent: Nov. 13, 2012

(54) ILLUMINATION SYSTEM AND DISPLAY DEVICE

(75) Inventors: Christoph Gerard August Hoelen, Eindhoven (NL); Rene Theodorus Wegh, Eindhoven (NL); Jan Broere, Eindhoven (NL); Ludo Haenen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 433 days.

(21) Appl. No.: 12/445,467

(22) PCT Filed: Oct. 15, 2007

(86) PCT No.: PCT/IB2007/054177
§ 371 (c)(1),
(2), (4) Date: Apr. 14, 2009

(87) PCT Pub. No.: WO2008/047290
PCT Pub. Date: Apr. 24, 2008

(65) Prior Publication Data
US 2010/0067214 A1    Mar. 18, 2010

(30) Foreign Application Priority Data
Oct. 18, 2006    (EP) ..................................... 06122482

(51) Int. Cl.
*H01J 1/62*    (2006.01)

(52) U.S. Cl. ....................................... 313/502; 313/503
(58) Field of Classification Search ................. 313/498, 313/502, 503; 250/301.4 R
See application file for complete search history.

(56) References Cited

U.S. PATENT DOCUMENTS

| 6,608,332 | B2 | 8/2003 | Shimizu et al. |
| 2005/0145868 | A1 | 7/2005 | Kummer et al. |
| 2005/0280357 | A1 | 12/2005 | Shimizu et al. |
| 2006/0097245 | A1 | 5/2006 | Aanegola et al. |
| 2006/0133063 | A1 | 6/2006 | Debray et al. |
| 2006/0197443 | A1 | 9/2006 | Setlur et al. |

FOREIGN PATENT DOCUMENTS
| EP | 1521235 A2 | 4/2005 |
| WO | 2006095284 A1 | 9/2006 |

*Primary Examiner* — Vip Patel
(74) *Attorney, Agent, or Firm* — Gregory Thorne; Mark Beloborodov

(57) ABSTRACT

A luminair and a display device including a light emitting diode, a light exit window and a luminescent layer arranged between the light emitting diode and the light exit window. The light emitting diode emits light of a first primary color. The luminescent layer is arranged between the light emitting diode and the light exit window for converting part of the light emitted by the light emitting diode into light of a second primary color. The luminescent layer includes a garnet luminescent material of one of at least Lutetium, Cerium, Silicon and Nitrogen, or a combination of a garnet luminescent material of at least Lutetium and Cerium and a garnet luminescent material of at least Cerium and at least one of Yttrium and Gadolinium.

13 Claims, 5 Drawing Sheets

ILLUMINATION SYSTEM AND DISPLAY DEVICE

FIELD OF THE INVENTION

The invention relates to an illumination system comprising a light emitting diode, a light exit window and a luminescent layer.

The invention also relates to a luminair and a display device.

BACKGROUND OF THE INVENTION

Such illumination systems are known per se. They are used, inter alia, as luminair for general lighting purposes, for example, for office lighting or shop lighting, for example, shop window lighting or lighting of (transparent or semi-transparent) plates of glass or (transparent) plates of glass or (transparent) synthetic resin on which items, for example jewelry, are displayed. In addition, such illumination systems are used for general lighting purposes, such as for large-area direct-view light emitting panels such as applied, for instance, in signage, contour lighting, and billboards.

Such known illumination systems are also used as back-light-emitting panels in (image) display devices. Such illumination systems can particularly suitably be used as an illumination source in non-emissive displays, such as liquid crystal display devices, also referred to as LCD panels, which are used in, for example, television receivers, (computer) monitors, (cordless) telephones and portable digital assistance. The illumination systems can also be used in, for example, projection systems such as a digital projector, or so-called beamer, for projecting images or displaying a television program, a film, a video program or a DVD, or the like.

Such an illumination system is, for example, disclosed in EP 1 521 235 A2. The illumination system comprises a two-dimensional array of light emitting diodes (further also referred to as LEDs) placed on a rear panel of the illumination system. In an embodiment of the illumination system in the cited document, the LEDs all emit light of substantially the same color, for example, a primary color blue. The illumination system further comprises a layer of color-converting phosphor which is arranged on a cover plate of the illumination system, resulting in a so-called remote phosphor configuration. The phosphor layer is a uniform layer, for example, comprising a phosphor Yttrium Aluminum Garnet (further also indicated as YAG:Ce), converting light of the primary color blue into light of a primary color yellow. The layer may be a film with uniform density of particles or a luminescent dye distributed throughout the film. Some of the light of the primary color blue emitted by the LED is transmitted by the phosphor layer so that yellow and blue light components both are transmitted to the display device for illuminating the display device. The illumination system comprising blue LEDs can be used for a large range of different displays, with different types of color filters. By changing the thickness of the phosphor layer and/or the concentration of the phosphor in the phosphor layer, the light emitted by the illumination system can be optimized to fit a particular LCD.

A drawback of the known illumination system is that a color temperature of the light emitted from the display device is too low.

SUMMARY OF THE INVENTION

It is an object of the invention to provide an illumination system having an improved color temperature.

According to a first aspect of the invention the object is achieved with an illumination system comprising:
 a light emitting diode emitting light of a first primary color,
 a light exit window for emitting light from the illumination system, and
 a luminescent layer arranged between the light emitting diode and the light exit window for converting at least part of the light emitted by the light emitting diode into light of a second primary color, the luminescent layer comprising a garnet luminescent material comprising at least Lutetium, Cerium, Silicon and Nitrogen, or comprising a combination of a garnet luminescent material comprising at least Lutetium and Cerium and a garnet luminescent material comprising at least Cerium and at least one element of the group comprising Yttrium and Gadolinium.

The effect of the measures according to the invention is that by replacing the Yttrium Aluminum Garnet luminescent material by the garnet luminescent material comprising at least Lutetium, Cerium, Silicon and Nitrogen, or comprising a combination of a garnet luminescent material comprising at least Lutetium and Cerium and a garnet luminescent material comprising at least Cerium and at least one element of the group comprising Yttrium and Gadolinium, a central wavelength of the primary color yellow emitted by the luminescent layer is shifted towards a shorter wavelength compared to the primary color yellow emitted by a luminescent layer comprising only Cerium-activated Yttrium Aluminum Garnet, also referred to as YAG:Ce. Due to this shift of the central wavelength of the primary color yellow, a color point resulting from a contribution of the primary color yellow and the primary color blue of the light emitted by the illumination system is also shifted to a shorter wavelength, resulting in an increase of the color temperature of light emitted by the illumination system.

A further benefit when using the garnet luminescent material comprising at least Lutetium, Cerium, Silicon and Nitrogen, or comprising a combination of a garnet luminescent material comprising at least Lutetium and Cerium and a garnet luminescent material comprising at least Cerium and at least one element of the group comprising Yttrium and Gadolinium, is that a spectral content of the primary color yellow emitted by the luminescent layer is increased, which results in a relatively large color gamut of a display device comprising the illumination system. The spectral content of the illumination system defines a range of colors of the light emitted by the illumination system. When using these luminescent materials, the emission spectrum of the primary color yellow broadens with respect to the known luminescent material YAG:Ce, which results in an increase of the range of colors of the light emitted by the illumination system, resulting in an improvement of the spectral content of the illumination system. In the embodiment in which the illumination system comprises a luminescent material comprising Silicon Nitride, the addition of said Silicon Nitride broadens the emission spectrum compared to the emission spectrum without Silicon Nitride. An example of the garnet luminescent material comprising at least Lutetium and Cerium is, for example, Cerium-activated Lutetium Aluminum Garnet, also indicated as LuAG:Ce. An example of the garnet luminescent material comprising at least Cerium and at least one element of the group comprising Yttrium and Gadolinium is, for example, Cerium-activated Yttrium Aluminum Garnet, also indicated as YAG:Ce. In the embodiment in which the illumination system comprises a combination of LuAG:Ce and YAG:Ce, the emission spectrum of the primary color yellow is broadened by the combination of the emission spectrum of LuAG:Ce and the emission spectrum of YAG:Ce. Both luminescent materials LuAG:Ce and YAG:Ce emit light which is perceived as yellow or green-yellow, further referred to as yellow. The center wavelength, being the spectrally weighted center wavelength of the emission spectum, of the light emitted by the luminescent material LuAG:Ce (typically approximately 560 nanometer) is shifted towards a shorter wavelength compared to the center wavelength of the light emitted by the luminescent material YAG:Ce (typically approximately 590 nanometer). A combination of the two emission spectra results in the emitted primary color yellow of which the emission spectrum of the light is broadened, with a resulting center wavelength of e.g. about 580 nm. A broader emission spectrum of the primary color yellow emitted by the illumination system also typically results in an increased color gamut of the display device comprising the illumination system, because the broader emission spectrum of the primary color yellow increases an overlap of the light emitted by the illumination system and the color filters of the display device.

The color gamut of the illumination system according to the invention is partially determined by the choice of the primary color blue emitted by the LED. The color temperature of the illumination system may be increased by shifting the center wavelength of the primary color blue emitted by the LED towards a longer wavelength blue. However, the shift of the center wavelength of the light emitted by the LED also results in a decrease of the color gamut area which overlaps the standardized EBU (European Broadcasting Union) color gamut area or which overlaps an NTSC (National Television System Committee) color gamut area, especially in the purple region. Alternatively, by replacing YAG:Ce by Cerium-activated Lutetium Aluminum Garnet comprising Silicon Nitride, also referred to as LuAGSN:Ce, or, for example, by adding LuAG:Ce to YAG:Ce, the center wavelength of the light emitted by the luminescent layer shifts towards the green, increasing the color temperature of the illumination system while maintaining the relatively broad color gamut of the display device.

An additional benefit when using the garnet luminescent material comprising at least Lutetium, Cerium, Silicon and Nitrogen is that a single luminescent material enables the shift of the center wavelength of the primary color yellow emitted by the luminescent layer to increase the color temperature of the illumination system, which simplifies the manufacturing of the luminescent layer.

An additional benefit when using the combination of the garnet luminescent material comprising at least Lutetium and Cerium and the garnet luminescent material comprising at least Cerium and at least one element of the group comprising Yttrium and Gadolinium, is that a concentration or a total of the individual luminescent materials of the combination can be tuned, enabling a tuning of the color point of the light emitted by the illumination system. This tuning may, for example, be used to correct for variations in the primary color blue emitted by the LED. By adapting the concentration of the individual luminescent materials, the color point of the light emitted by the illumination system can be tuned to ensure that the light emitted by the illumination system substantially always corresponds to a predefined color point of the illumination system. This tuning may also, for example, be used to correct for variations in the color filter of the display device when combining the illumination system with the display device. Additionally, the tuning of the concentration of the individual luminescent materials in the illumination system can, for example, be used to tune the color temperature of the display device so as to be at a required level. As the color filters used in a specific display device are known, the concentration can be chosen such that the color temperature of the light emitted by the display device corresponds to a predefined display color temperature.

In an embodiment of the illumination system, the garnet luminescent material comprising at least Lutetium, Cerium, Silicon and Nitrogen or the garnet luminescent material comprising at least Lutetium and Cerium further comprises Gadolinium. A benefit of this embodiment is that the addition of Gadolinium results in a luminescent material having a light emission peak of which the central wavelength is shifted towards a longer wavelength compared to the luminescent materials without Gadolinium. The addition of Gadolinium increases the range over which the color point of the illumination system can be tuned, and thus increases the range over which the color temperature of the display device can be tuned.

In an embodiment of the illumination system, the garnet luminescent material comprising at least Lutetium, Cerium, Silicon and Nitrogen is represented by $(Y_{3-x-y}Lu_xGd_y)(Al_{5-z}Si_z)(O_{12-z}N_z):Ce$, where $0<x\leq3$, $0\leq y\leq2.7$, $0<x+y\leq3$ and $0<z\leq2$, the garnet luminescent material comprising at least Lutetium and Cerium is represented by $(Y_{3-x-y}Lu_xGd_y)(Al_{5-z}Si_z)(O_{12-z}N_z):Ce$, where $0<x\leq3$, $0\leq y\leq2.7$, $0<x+y\leq3$ and $0\leq z\leq2$, and the garnet luminescent material comprising at least Cerium and comprising at least one element of the group comprising Yttrium and Gadolinium is represented by $(Y_{3-x-y}Lu_xGd_y)(Al_{5-z}Si_z)(O_{12-z}N_z):Ce$, where $0\leq x<3$, $0\leq y\leq2.7$, $0\leq x+y\leq3$ and $0\leq z\leq2$. In this embodiment, each one of the different luminescent materials can be represented by a single formula in which the requirements to the suffixes x, y and z are different.

In an embodiment of the illumination system comprising a combination of two luminescent materials, a molar concentration of a first of the two luminescent materials in the luminescent layer (120) is 1 to 3 times larger than a molar concentration of the second of the two luminescent materials. Here, molar concentration refers to molar concentration per unit area of the luminescent layer. For example, in an embodiment comprising LuAG:Ce and YAG:Ce or LuAG:Ce and Cerium-activated Yttrium Gadolinium Aluminum Garnet, also referred to as YGdAG:Ce, a concentration of YAG:Ce or YGdAG:Ce in the luminescent layer is 1 to 3 times larger than a concentration of LuAG:Ce. A benefit of this embodiment is that this combination of luminescent materials and the light emitted by the LEDs enables the color temperature of the display device, which combines the illumination system with known color filters, to be tunable from approximately 6000 Kelvin up to approximately 12000 Kelvin.

In an embodiment of the illumination system comprising a combination of two luminescent materials, a variation of a central wavelength emitted by the light emitting diode is compensated by altering a molar concentration of any of the two luminescent materials in the luminescent layer. When the luminescent layer, for example, comprises LuAG:Ce and YAG:Ce, a shift of a central wavelength emitted by the light emitting diode is compensated by altering a molar concentration of the LuAG:Ce in the luminescent layer, or by altering a molar concentration of the YAG:Ce in the luminescent layer, or both. A benefit of this embodiment is that the altering of the concentration of LuAG:Ce or YAG:Ce can be used to ensure that the light emitted by the illumination system substantially corresponds to the predefined backlight color point even when the central wavelength emitted by the light emitting diode, or the average central wavelength of the various light emitting diodes in the illumination system, is altered.

In an embodiment of the illumination system comprising a combination of two luminescent materials, the luminescent layer includes a layer comprising a first of the two luminescent materials and includes a further layer comprising a second of the two luminescent materials. When, for example, the illumination system comprises LuAG:Ce and YAG:Ce, the luminescent layer comprises a layer comprising LuAG:Ce and a layer comprising YAG:Ce. A benefit of this embodiment is that the individually applied layers comprising LuAG:Ce and YAG:Ce, respectively, enable a relatively easy change of the molar concentration of the individual luminescent materials in the luminescent layer by changing, for example, a thickness of the individual layers applied for each of the luminescent materials, or, for example, by changing a molar concentration of the individual luminescent materials in their individually applied layers. The individual layers comprising LuAG:Ce and comprising YAG:Ce may be applied on top of each other, or, alternatively, may be applied on different surfaces of, for example, a diffusing element, or may be applied on different substrates, for example, a bulk diffuser plate and a sheet diffuser, or a diffuser element and a brightness enhancement element.

In an embodiment of the illumination system comprising the garnet luminescent material comprising at least Lutetium, Cerium, Silicon and Nitrogen, the luminescent layer further comprises a garnet luminescent material comprising at least Cerium, Silicon and Nitrogen and at least one element of the group comprising Yttrium and Gadolinium. The garnet luminescent material comprising at least Cerium, Silicon and Nitrogen and at least one element of the group comprising Yttrium and Gadolinium, for example, comprises Cerium-activated Yttrium Aluminum Garnet comprising Silicon Nitride (further also referred to as YAGSN:Ce) and, for example, Cerium-activated Yttrium Gadolinium Aluminum Garnet comprising Silicon Nitride (further also referred to as YGDAGSN:Ce). A benefit of this embodiment is that the addition of YAGSN:Ce or YGDAGSN:Ce enables the central wavelength of the primary color yellow emitted by the luminescent layer to be tunable by altering a concentration of the individual luminescent materials LuAGSN:Ce and YAGSN:Ce in the luminescent layer. Moreover, the addition of Silicon Nitride to YAG:Ce broadens the emission spectrum compared to the emission spectrum of YAG:Ce, which again results in an increased color gamut of the illumination system according to the invention and of the display device comprising the illumination system according to the invention.

In an embodiment of the illumination system, the luminescent layer is arranged as a remote phosphor layer being a luminescent layer arranged at a distance from the light emitting diode. A benefit of applying the luminescent layer as a remote phosphor layer is that it allows a relatively broad range of luminescent materials to be used in the illumination system according to the invention. Generally, luminescent materials are directly applied to the light emitting diode. However, the choice of luminescent material that can be directly applied to the light emitting diode is limited, because this luminescent material must be able to withstand, in operation, a relatively high temperature of the light emitting diode, and at the same time must be able to withstand, in operation, a relatively high light-energy flux emitted by the light emitting diode. The high temperature and high light-energy flux generally result in a gradual degradation of the luminescent material, and hence in a gradual reduction of the efficiency of the illumination system. In the illumination system according to the invention, the luminescent material is applied facing away from the light emitting diode. The distance away from the light emitting diode results in a reduction of the temperature of the luminescent material, when expressed in degrees centigrade, by at least 20% compared to the temperature of the luminescent material when applied directly on the light emitting diode, and in a reduction of the light energy flux density of the first primary color incident on the luminescent material by at least 90%. This arrangement of the luminescent material reduces the requirements on the luminescent material as regards their ability to withstand the high temperature and the high light-energy flux, and, in addition, reduces the gradual degradation of the luminescent material.

In an embodiment of the illumination system, the illumination system comprises a light-mixing element arranged between the light emitting diode and the luminescent layer. The light-mixing element may, for example, be a housing having specularly or diffusively reflective surfaces for mixing and recycling the light. Alternatively the light-mixing element may be a light guide in which the light emitted by the LED is mixed using, for example, total internal reflection. The light-mixing element may also be a diffuser element.

In an embodiment of the illumination system, the illumination system comprises a reflective polarizer film and/or a collimator film between the luminescent layer and the light exit window. An example of a reflective polarizer film is, for example, a DBEF film. The DBEF (Dual Brightness Enhancement Film) substantially only transmits light having a predefined polarization direction, and reflects the remainder of the light back into the illumination system for recycling, thus acting as a polarizer film. An example of a collimator film is, for example, a BEF film. The BEF (Brightness Enhancement Film) only transmits light which impinges on the BEF at an angle of incidence which is within a predefined range, while the BEF reflects the remainder of the light back into the illumination system for recycling, thus collimating the light. The use of the BEF and/or DBEF results in an increase of the efficiency of the illumination system, because light which does not comply with the predefined range of angles of incidence or does not substantially comply with the predefined polarization direction is recycled and, at least partially, reused. An additional benefit when using the BEF and/or DBEF is that the thickness of the luminescent layer may be reduced due to the recycling of light, as the recycling enhances the mixing of light. When light of the primary color blue emitted by the LED is recycled and impinges on the luminescent layer, part of the recycled light will be converted into light of the primary color yellow, increasing the contribution of the primary color yellow to the light emitted by the illumination system and reducing the contribution of the primary color blue to the light emitted by the illumination system. To compensate the increase of the contribution of the primary color yellow due to recycling, the thickness of the luminescent layer in the illumination system according to the invention may be reduced to ensure that the light emitted by the illumination system corresponds to the predefined color point.

In an embodiment of the illumination system, the illumination system comprises at least two light emitting diodes, an emission spectrum of each of the two light emitting diodes having a center wavelength such that the center wavelength of one of the two light emitting diodes is shifted at least 5 nanometers from the center wavelength of the other of the two light emitting diodes. A benefit of this embodiment is that by choosing a specific concentration of the luminescent materials in the luminescent layer a broader variation in the primary color can be accepted while the color point of the light emitted by the illumination system is substantially equal to the predefined color point. Due to this acceptable broader variation, the illumination system according to the invention may comprise LEDs from different bins, which reduces the cost of manufacturing of the illumination system.

In an embodiment of the illumination system, the illumination system comprises at least two light emitting diodes, and the light emitting diodes are individually dimmable. Besides wavelength binning, the LEDs used in an illumination system are also binned according to the light-flux emitted from the LEDs. By ensuring that the LEDs of a plurality of LEDs are individually dimmable, a contribution of each of the LEDs can be tuned. Adapting the dimming individually may increase the uniformity of the light emitted from the illumination system. Alternatively, when the center wavelength of the light of the individual LEDs is different, individual dimming may be used to fine-tune the color point of the light emitted from the illumination system.

In an embodiment of the illumination system, the illumination system comprises a plurality of light emitting diodes, and the plurality of light emitting diodes, in operation, operate in a scanning mode of operation. This is possible due to the relatively short decay times of the Garnet luminescent materials. The illumination system comprises the luminescent layer in which the LEDs, for example, are arranged in one-dimensional clusters that can be driven sequentially with substantially equal amplitudes to reduce motion artifacts or that can be driven simultaneously or sequentially (possibly with temporal overlap) with drive currents that depend on, for example, a video content in order to achieve one-dimensional dimming. A benefit is that this mode of operation reduces power dissipation and increases the dynamic range and contrast ratio in a display device. The LCD pixel transmission values are adapted accordingly to generate the intended image. Because only a single primary color is used for illuminating the luminescent material, the illumination system is more uniform with respect to color than e.g. an illumination system comprising LED emitting light of different primary colors. The blue light should be sufficiently well mixed or homogenized when all the LEDs operate at nominal power. To prevent visible artifacts in the image, the clusters should have smooth profiles with sufficient spatial overlap in their light distributions, which is a natural characteristic of clusters in this type of system employing a remote phosphor layer.

The invention also relates to a luminair and a display device comprising the illumination system according to the invention.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF EMBODIMENTS

Figure 1A:
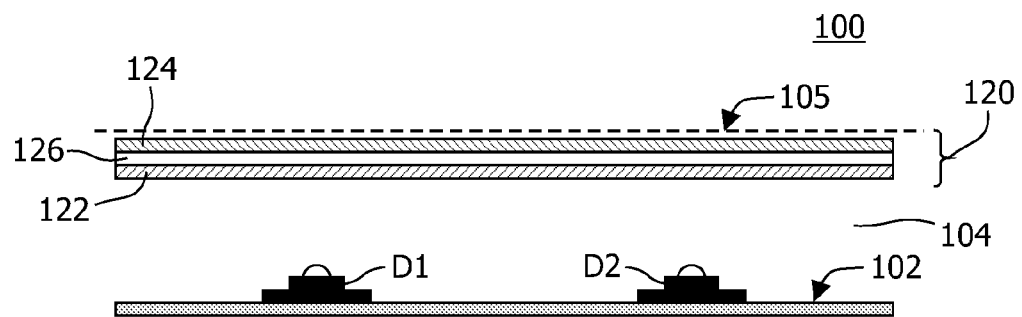
FIG. 1A shows a simplified cross-sectional view of an illumination system according to the invention.

FIG. 1A shows a simplified cross-sectional view of an illumination system 100 according to the invention. The illumination system 100 according to the invention comprises LEDs D1, D2 arranged on a reflective surface 102 of a light-mixing chamber 104 of the illumination system 100. The LEDs D1, D2 emit a first primary color, for example, a primary color blue 72, 75 (see FIGS. 2A, 3A, 4A) which impinges on the luminescent layer 120. The luminescent layer 120 comprises a garnet luminescent material comprising at least Lutetium, Cerium, Silicon and Nitrogen 73, or comprises a combination of a garnet luminescent material comprising at least Lutetium and Cerium 70 and a garnet luminescent material comprising at least Cerium and at least one element of the group comprising Yttrium and Gadolinium. Examples of these different luminescent materials are represented by $(Y_{3-x-y}Lu_xGd_y)(Al_{5-z}Si_z)(O_{12-z}N_z)$:Ce and comprise, for example, LuAG:Ce 70, LuAGSN:Ce 73, YAG:Ce 71, YGdAG:Ce, YAGSN:Ce 74, YGdAGSN:Ce. In the embodiment shown in FIG. 1A, the luminescent layer 120 is constituted of a first luminescent layer 122 and a second luminescent layer 124, each of the first and second luminescent layers 122, 124 being arranged on opposite sides of, for example, a carrier plate 126. The first and second luminescent layers 122, 124, for example, comprise different luminescent materials. Alternatively, the first and second luminescent layers 122, 124 may be applied at the same side (not shown) of the carrier plate 126; the carrier plate 126 may, for example, be transparent or diffuse. The luminescent layer 120 may alternatively be applied as one layer (see FIG. 1B), or may alternatively be applied directly on the LEDs D1, D2. A concentration of the different luminescent materials 70, 73, 71, 74 in the luminescent layer 120 or a thickness of the first and second luminescent layers 122, 124 determines how much of the light of the primary color blue 72, 75 emitted by the LEDs D1, D2 is converted into light having the primary color yellow and thus determines the color point 76, 77, 78 (see FIGS. 2A, 3A, 4A) of the light emitted by the illumination system 100 according to the invention. The light generated by the illumination system 100 is emitted via a light exit window 105.

Figure 1B:
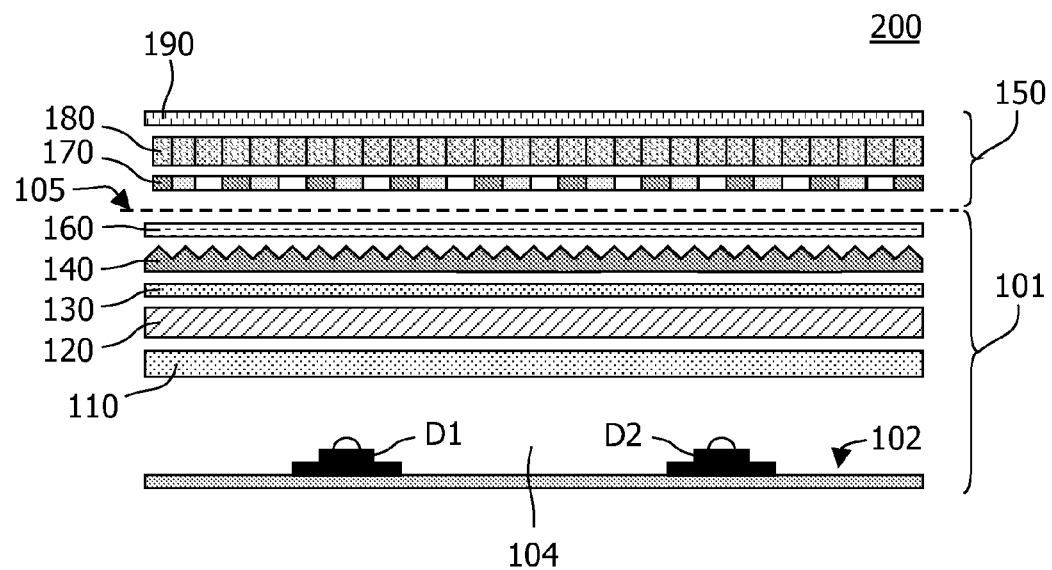
FIG. 1B shows a simplified cross-sectional view of a display device according to the invention.

FIG. 1B shows a simplified cross-sectional view of a display device 200 comprising the illumination system 101 according to the invention. The embodiment of the illumination system 101 according to the invention shown in FIG. 1B again comprises LEDs D1, D2 arranged on a reflective surface 102 of a light-mixing chamber 104 of the illumination system 101. In the embodiment of the illumination system 101 shown in FIG. 1B, the light emitted by the LEDs D1, D2 is mixed using a first light-mixing element 110, for example, a Lambertian diffuser element 110. After the light emitted by the LEDs D1, D2 has been diffused, it impinges on the luminescent layer 120. The luminescent layer 120 shown in FIG. 1B, for example, comprises a mix of different luminescent materials, for example, selected from the group comprising LuAG:Ce, LuAGSN:Ce, YAG:Ce, YGdAG:Ce and YAGSN:Ce. Alternatively, the luminescent layer 120 may be constituted of a single luminescent material, for example, LuAGSN:Ce. A molar concentration of the luminescent material or of the different luminescent materials in the luminescent layer 120 determines how much of the light emitted by the LEDs D1, D2 is converted into light having the primary color yellow and thus determines the color point 76, 77, 78 (see FIGS. 2A, 3A, 4A) of the light emitted by the illumination system 101 according to the invention. The illumination system 101 shown in FIG. 1B further comprises a second light-mixing element 130, for example, a further Lambertian diffuser element 130. Subsequently, the illumination system 101 comprises a BEF 140 which substantially only transmits light impinging on the BEF 140 at an angle of incidence which is within a predefined range, while the BEF 140 reflects the remainder of the light back into the illumination system 101 for recycling. In addition, the illumination system 101, for example, comprises a DBEF 160 which substantially only transmits light having a predefined polarization direction, and reflects the remainder of the light back into the illumination system 101 for recycling. The DBEF 160 may be used as a polarizer for an image-creation layer 150. The image creation layer 150, for example, comprises a set of color filters 170, an array of liquid crystal cells 180 and an analyzer 190 for creating an image on the display device 200. Alternatively, the image creation layer 150 comprises both a polarizer and an analyzer (both absorbing), and the DBEF acts as a pre-polarizer.

Figure 2A:
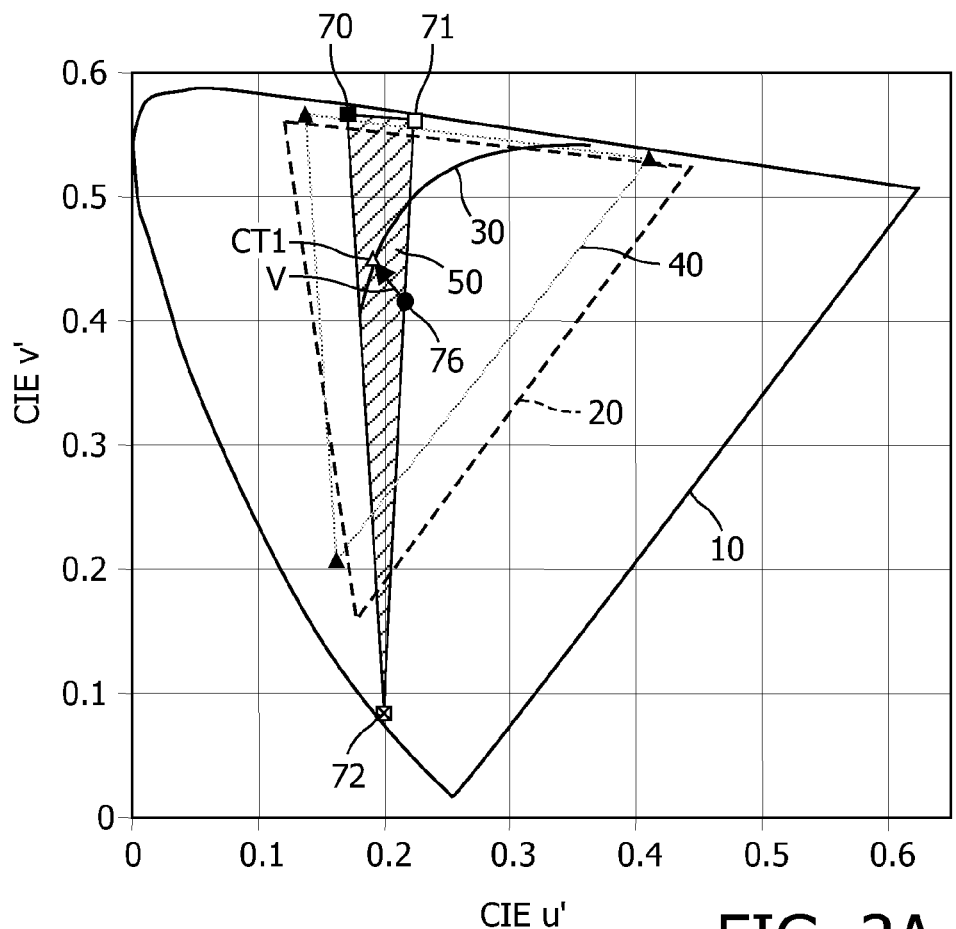
FIGS. 2A and 2B show a CIE 1976 u'v' diagram and an optical power density spectrum, respectively, of a combination of Cerium-activated Lutetium Aluminum Garnet and Cerium-activated Yttrium Aluminum Garnet.

FIG. 2A shows a CIE 1976 u'v'-diagram of a combination of Cerium-activated Lutetium Aluminum Garnet 70 and Cerium-activated Yttrium Aluminum Garnet 71 together with a light emitting diode D1, D2 (see FIG. 1A) emitting a primary color blue 72. The CIE 1976 u'v' diagram (further also indicated as u'v'-diagram) is a chromaticity diagram in a u'v' color space. The u'v'-diagram shown in FIG. 2A shows a spectral color perception line 10 indicating the spectral colors which can be perceived by the human eye. Also in the u'v'-diagram shown in FIG. 2A, an EBU color standard 20 is indicated with a dashed line forming a triangle. The EBU color standard 20 is a color gamut defined by the European Broadcasting Union related to phosphors typically used in television systems. In the u'v'-diagram, the upper left corner of the EBU-standard 20 represents green, the upper right corner of the EBU-standard 20 represents red and the lower corner of the EBU-standard represents blue. Further indicated in FIG. 2A is a line called the black body locus 30 (also known as Planckian locus) which is a path in a color space (in this case the u'v' color space) representing chromaticity points of a black body which correspond to different temperatures of a black body.

The u'v'-diagram shown in FIG. 2A comprises a color point of LuAG:Ce 70 having coordinates $u'_{70}=0.169$ and $v'_{70}=0.563$, a color point of YAG:Ce 71 having coordinates $u'_{71}=0.216$ and $v'_{71}=0.564$, and a color point 72 of the light emitted by the light emitting diode D1, D2 having coordinates $u'_{72}=0.200$ and $v'_{72}=0.086$. The hatched triangle 50 defined by the color points of LuAG:Ce 70 and of YAG:Ce 71 and the color point 72 of the light emitting diode D1, D2 represents a range within which a color of the light emitted by the illumination system 100, 101 (see FIGS. 1A and 1B) can be altered by altering a concentration of the individual luminescent materials LuAG:Ce 70 and YAG:Ce 71. A specific concentration ratio of the individual luminescent materials LuAG:Ce 70 and YAG:Ce 71 together with a remainder of the light emitted by the light emitting diode D1, D2 which is not converted by the luminescent materials LuAG:Ce 70 and YAG:Ce 71 and which is determined by the total amount of luminescent materials LuAG:Ce 70 and YAG:Ce 71 results in a color point 76 representing the color of the light emitted by the illumination system 100, 101 (see FIGS. 1A and 1B). Combining the illumination system 100, 101 having a color point 76 with a transmission spectrum of a typical set of color filters 170, for example, used in a display device 200 (see FIG. 1B), results in a color gamut 40 of the display device 200. Due to the combination of the illumination system 100, 101 with the typical set of color filters 170, the color point 76 representing the color emitted by the illumination system 100, 101 is changed to a color point with color temperature CT1 of the light emitted by the display device 100.

By adding LuAG:Ce 70 to YAG:Ce 71 the color point of the illumination system 100, 101 shifts towards shorter wavelengths compared to a luminescent layer comprising only YAG:Ce, which results in an increased color temperature 76 of the illumination system 100, 101. Adding the typical set of color filters 170 to the illumination system 100, 101 according to the invention, the color point 76 of the illumination system 100, 101 generally shifts along a vector V having a filter-specific length and having a filter-specific orientation that also depends on the actual spectrum of the light emitted by the backlight system. The shift of the color point of the illumination system 100, 101 to shorter wavelengths, compared to illumination systems comprising only the known luminescent material YAG:Ce, also results in a shift of the color temperature of the display device 200 to shorter wavelengths, resulting in an increase of the color temperature CT1 of the light emitted by the display device 200.

Furthermore, by controlling the ratio of a concentration of the individual luminescent materials LuAG:Ce 70 and YAG:Ce 71, and by controlling the amount of light not converted by the luminescent materials LuAG:Ce 70 and YAG:Ce 71 via tuning of the concentration or total amount of luminescent materials LuAG:Ce 70 and YAG:CE 71, the color temperature 76 of the light emitted by the illumination system 100, 101 can be controlled within the range indicated with a hatched triangle 50. The altering of the color temperature 76 of the light emitted by the illumination system 100, 101 subsequently leads to a change of the color temperature CT1 of the display device 200 comprising the illumination system 100, 101.

Figure 2B:
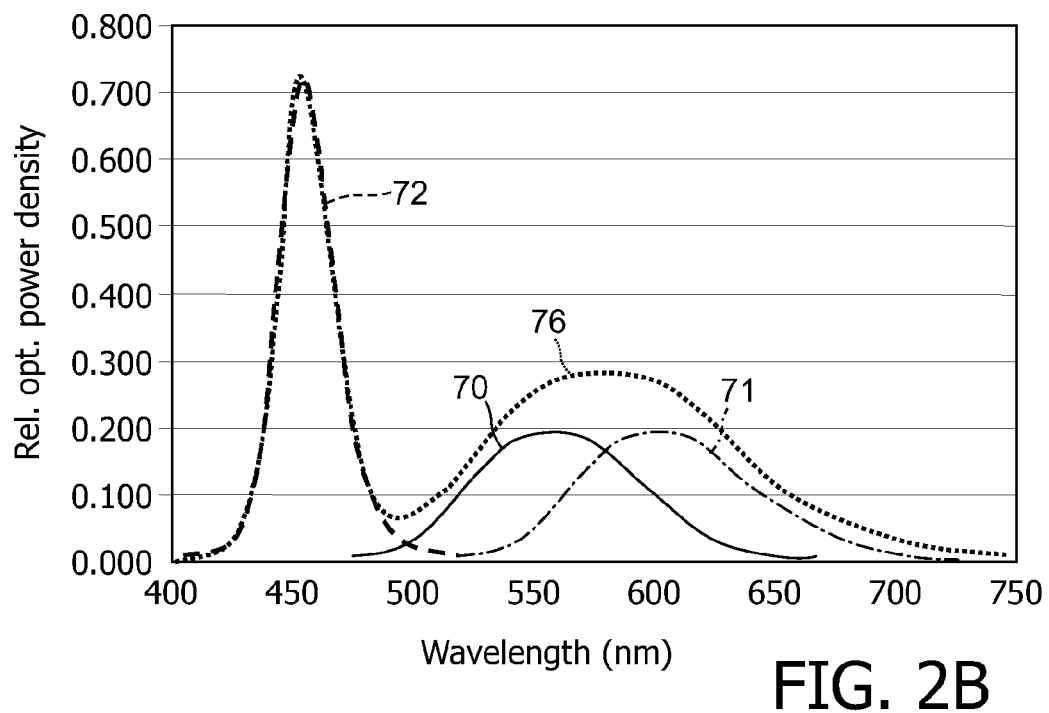

FIG. 2B shows an optical power density spectrum of the light emitted by the illumination system 100, 101 combining Cerium-activated Lutetium Aluminum Garnet 70 and Cerium-activated Yttrium Aluminum Garnet 71 together with the light emitting diode D1, D2 emitting a primary color blue 72. The optical power density spectrum 76 of the light emitted by the illumination system 100, 101 is constituted of a contribution of the spectrum of the light emitted by the LED D1, D2 emitting the spectrum of the primary color blue 72 and the spectrum of the light emitted by the luminescent materials LuAG:Ce 70 and YAG:Ce 71 together emitting the spectrum of the primary color yellow. Changing the concentration of the individual luminescent materials LuAG:Ce 70 and YAG:Ce 71 will result in a difference in the contributions of the individual luminescent materials LuAG:Ce 70 and YAG:Ce 71 and of the light emitted by the LED D1, D2 to the optical power density spectrum 76 of the illumination system 100, 101 according to the invention. This changing of the concentration of the individual luminescent materials LuAG:Ce 70 and YAG:Ce 71 enables the color point 76 indicated in the u'v'-diagram to be moved within the hatched triangle 50 indicated in FIG. 2A.

Figure 3A:
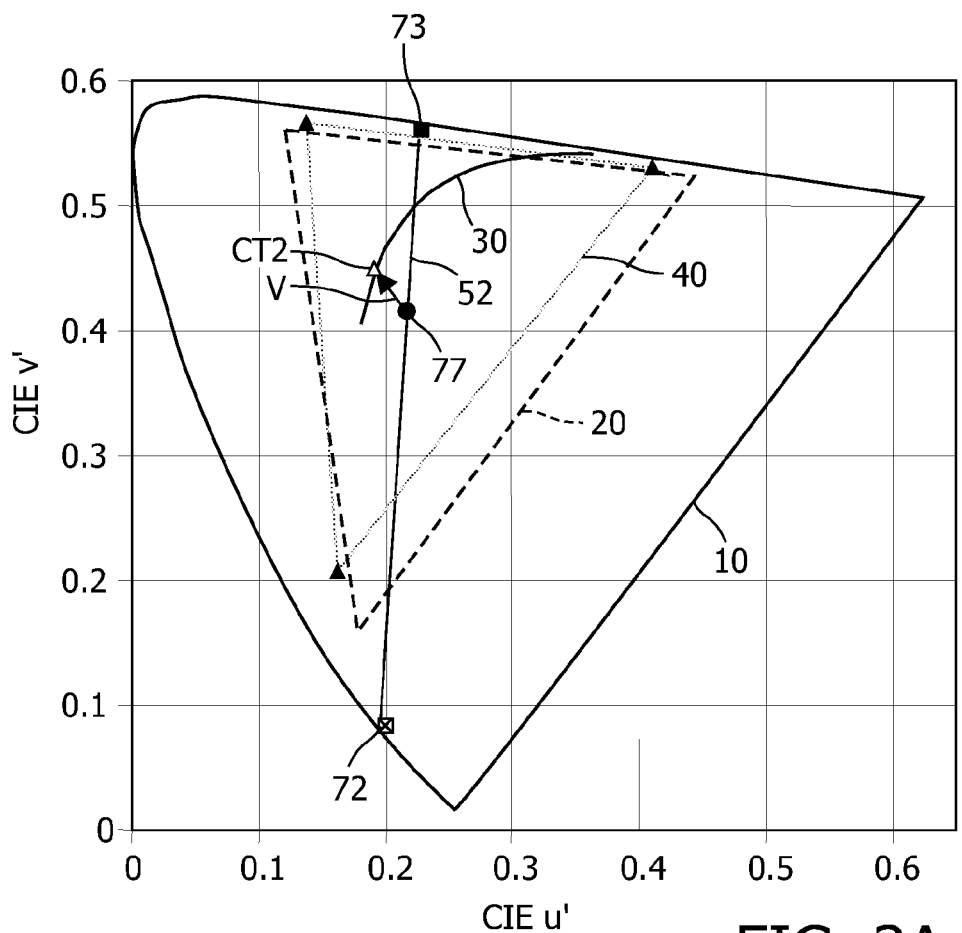
FIGS. 3A and 3B show a CIE 1976 u'v' diagram and an optical power density spectrum of Cerium-activated Lutetium Aluminum Garnet comprising Silicon Nitride, respectively.

FIG. 3A shows a CIE 1976 u'v' diagram of Cerium-activated Lutetium Aluminum Garnet comprising Silicon Nitride 73 together with a light emitting diode D1, D2 emitting the primary color blue 72. A color point of LuAGSN:Ce 73 has coordinates $u'_{73}=0.209$ and $v'_{73}=0.560$. A line 52 connecting the color point of LuAGSN:Ce 73 and color point 72 of the light emitted by the LED D1, D2 represents a range within which the color of the light emitted by the illumination system 100, 101 (see FIGS. 1A and 1B) can be altered by altering a concentration of the luminescent material LuAGSN:Ce 73.

The use of a specific concentration of the luminescent material LuAGSN:Ce in the luminescent layer 120 together with the LED D1, D2 emitting the primary color blue 72 results in a color point 77 of the illumination system 100, 101 which is shifted toward shorter wavelengths with respect to an illumination system comprising only the luminescent material YAG:Ce. When combining the illumination system 100, 101 comprising LuAGSN:Ce with the typical set of color filters 170 of the display device 200, the light emitted by the display device 200 comprises a color point CT2 which is shifted along the vector V with respect to the color point 77 of the light emitted by the illumination system 100, 101.

Figure 3B:
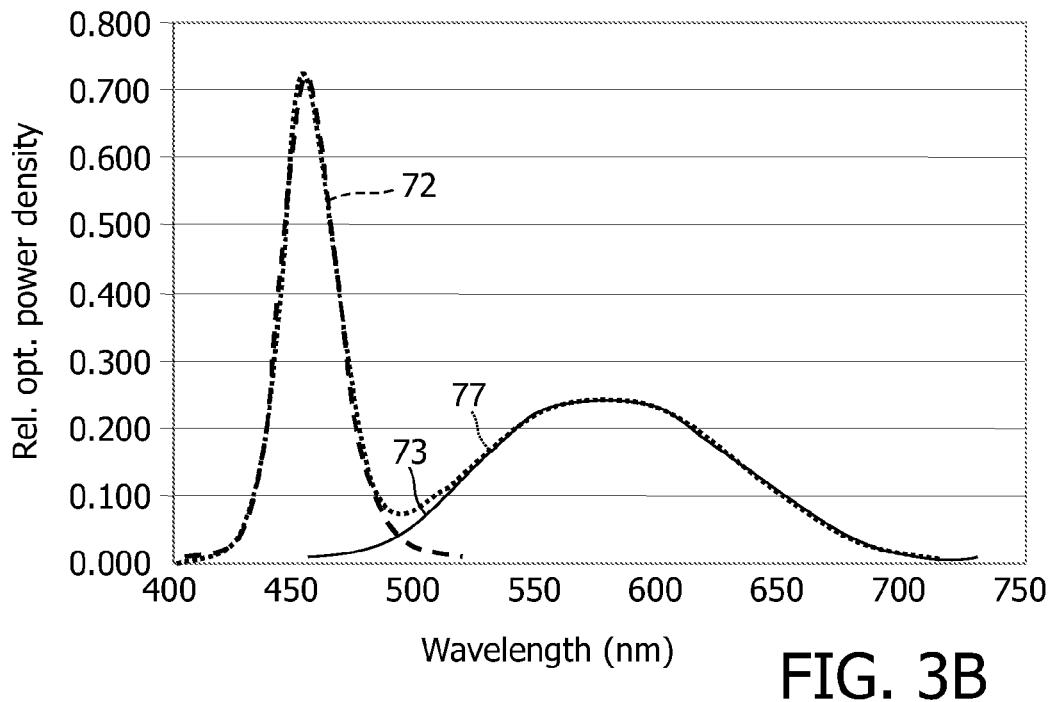

FIG. 3B shows an optical power density spectrum of the light emitted by the illumination system 100, 101 (see FIGS. 1A and 1B) comprising Cerium-activated Lutetium Aluminum Garnet comprising Silicon Nitride 73 together with a light emitting diode D1, D2 emitting the primary color blue 72. The optical power density spectrum 77 of the light emitted by the illumination system 100, 101 is constituted of a contribution of the spectrum of the light emitted by the LED D1, D2 emitting the spectrum of the primary color blue 72 and the spectrum of the light emitted by the luminescent material LuAGSN:Ce 73 emitting the primary color yellow. When altering the concentration of the luminescent material LuAGSN:Ce 73 within the luminescent layer 120, the contribution of the primary color yellow emitted by LuAGSN:Ce 73 alters with respect to the primary color blue 72 emitted by the LED D1, D2, which alters the optical power density spectrum 77 of the illumination system 100, 101 according to the invention and thus alters the color point 77 of the light emitted by the illumination system 100, 101.

Figure 4A:
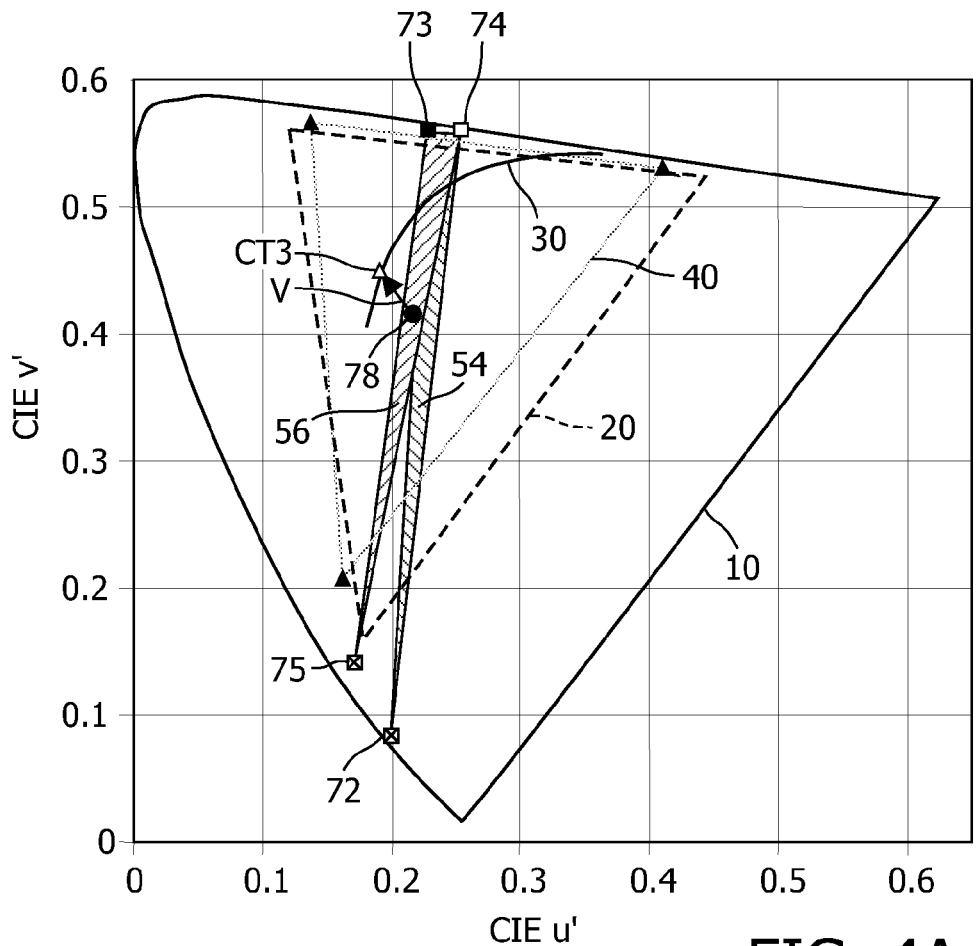
FIGS. 4A, 4B and 4C show a CIE 1976 u'v' diagram and a first and second optical power density spectrum, respectively, of a combination of Cerium-activated Lutetium Aluminum Garnet comprising Silicon Nitride and Cerium-activated Yttrium Aluminum Garnet comprising Silicon Nitride.

FIG. 4A shows a CIE 1976 u'v' diagram of Cerium-activated Lutetium Aluminum Garnet comprising Silicon Nitride 73 and Cerium-activated Yttrium Aluminum Garnet comprising Silicon Nitride 74 together with a light emitting diode D1, D2 emitting the primary color blue 72. Alternatively the u'v'-diagram of FIG. 4A shows a combination of LuAGSN:Ce 73 and YAGSN:Ce 74 together with a light emitting diode D1, D2 emitting a further primary color blue 75 being shifted with respect to the primary color blue 72. The shift of the primary color blue may, for example, result from differences in the manufacturing process of the LEDs D1, D2. A color point of LuAGSN:Ce 73 has coordinates $u'_{73}=0.209$ and $v'_{73}=0.560$, a color point of YAGSN:Ce 74 has coordinates $u'_{74}=0.230$ and $v'_{74}=0.562$, a color point of the primary color blue 72 is $u'_{72}=0.200$ and $v'_{72}=0.086$, and a color point of the further primary color blue 75 is, for example, $u'_{75}=0.171$ and $v'_{75}=0.130$. A first hatched triangle 54, defined by the color points of LuAGSN:Ce 73 and of YAGSN:Ce 74 and the color point 72 of the light emitting diode D1, D2, represents a range within which a color of the light emitted by the illumination system 100, 101 can be altered by altering a concentration of the individual luminescent materials LuAGSN:Ce 73 and YAGSN:Ce 74. A second hatched triangle 56, defined by the color points of LuAGSN:Ce 73 and of YAGSN:Ce 74 and the further color point 75 of the light emitting diode D1, D2, represents a range within which a color of the light emitted by the illumination system 100, 101 can be altered by altering a concentration of the individual luminescent materials LuAGSN:Ce 73 and YAGSN:Ce 74. A specific concentration of the individual luminescent materials LuAGSN:Ce 73 and YAGSN:Ce 74 together with a remainder of the light of the primary color blue 72 emitted by the light emitting diode D1, D2 which is not converted by the luminescent materials LuAGSN:Ce 73 and YAGSN:Ce 74 results in a color point 78 representing the color of the light emitted by the illumination system 100, 101. Alternatively, a further concentration of the individual luminescent materials LuAGSN:Ce 73 and YAGSN:Ce 74 together with a remainder of the light of the further primary color blue 75 emitted by the light emitting diode D1, D2 which is not converted by the luminescent materials LuAGSN:Ce 73 and YAGSN:Ce 74 also results in the color point 78. Thus, it can be seen that a change in the central wavelength of the light emitted by the LED D1, D2 can be compensated by changing the concentration of the individual luminescent materials LuAGSN:Ce 73 and YAGSN:Ce in the luminescent layer 120. Subsequently, the combination of the illumination system 100, 101 having a color point 78 with a transmission spectrum of a typical set of color filters 170, for example, used in a display device 200, results in a color gamut 40 of the display device 200. Due to the combination of the illumination system 100, 101 with the typical set of color filters 170, the color point 78 representing the color emitted by the illumination system 100, 101 is changed to the color temperature CT3 of the light emitted by the display device 100.

Figure 4B:
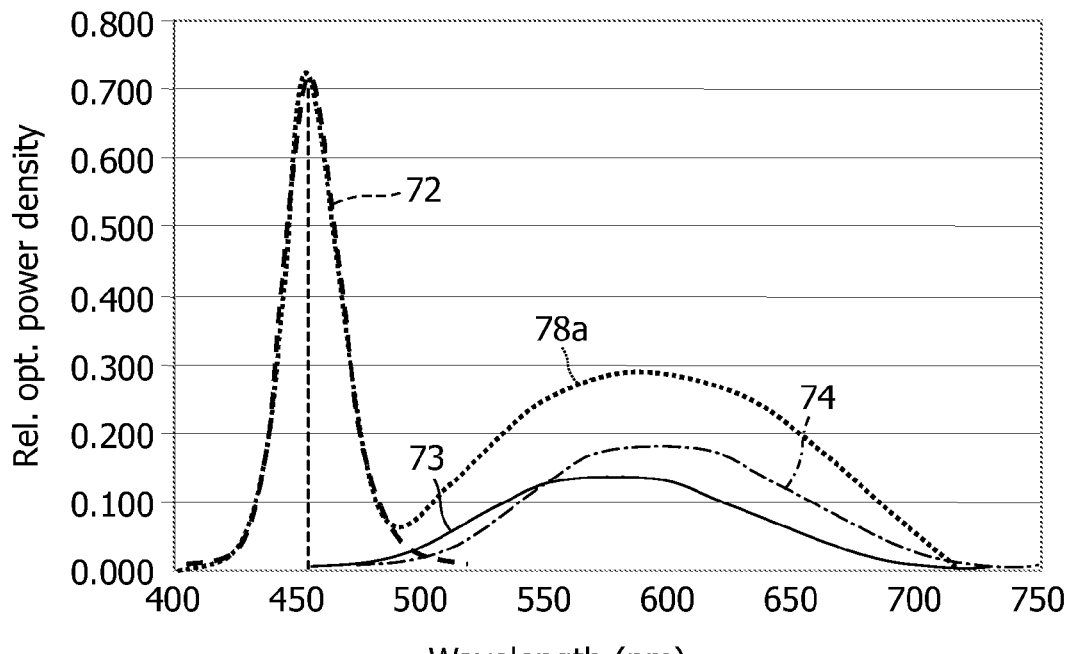

FIG. 4B shows an optical power density spectrum of the light emitted by the illumination system 100, 101 comprising Cerium-activated Lutetium Aluminum Garnet comprising Silicon Nitride 73 and Cerium-activated Yttrium Aluminum Garnet comprising Silicon Nitride 74 together with a light emitting diode D1, D2 emitting the primary color blue 72. The optical power density spectrum 78a of the light emitted by the illumination system 100, 101 is constituted of a contribution of the spectrum of the light emitted by the LED D1, D2 emitting the spectrum of the primary color blue 72 and the spectrum of the light emitted by the luminescent materials LuAGSN:Ce 73 and YAGSN:Ce 74, together emitting the primary color yellow. The optical power density spectrum 78a, when plotted in the u'v'-diagram of FIG. 4A, results in the color point 78. Altering the concentration of the individual luminescent materials LuAGSN:Ce 73 and YAGSN:Ce 74 within the luminescent layer 120, the contribution of the primary color yellow emitted by LuAGSN:Ce 73 and YAGSN:Ce 74 alters with respect to the primary color blue 72 emitted by the LED D1, D2, which alters the optical power density spectrum 78a of the illumination system 100, 101 according to the invention and thus alters the color point 78 of the light emitted by the illumination system 100, 101.

Figure 4C:
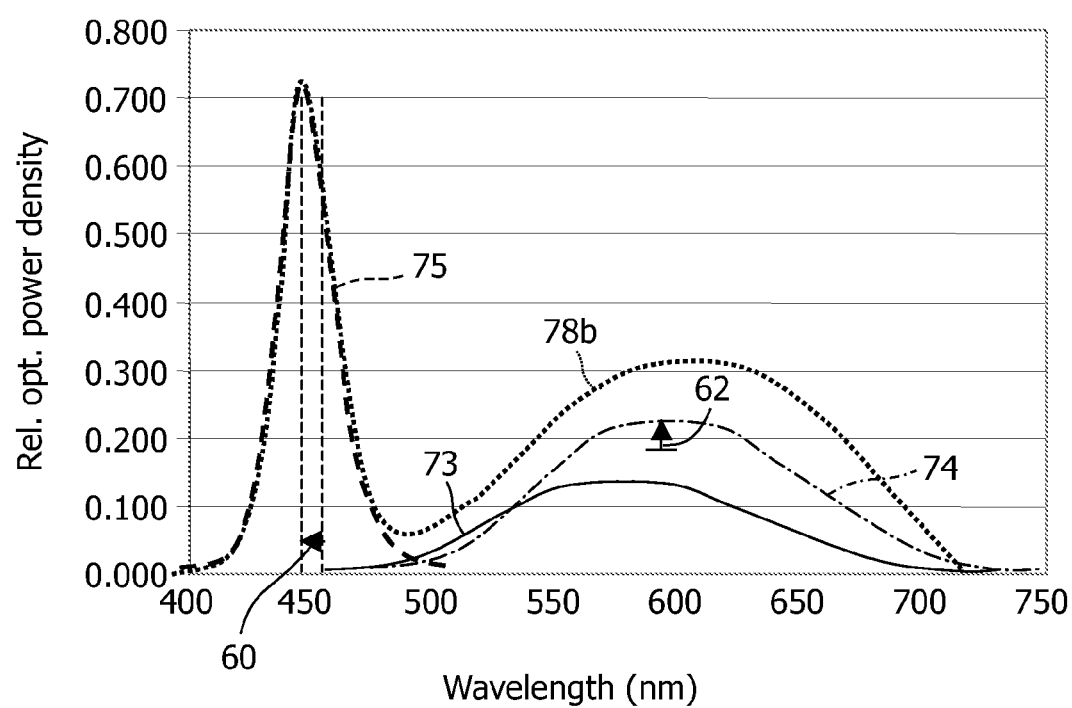

FIG. 4C shows an optical power density spectrum of the light emitted by the illumination system 100, 101 comprising Cerium-activated Lutetium Aluminum Garnet comprising Silicon Nitride 73 and Cerium-activated Yttrium Aluminum Garnet comprising Silicon Nitride 74 together with a light emitting diode D1, D2 emitting the further primary color blue 75. The optical power density spectrum 78b of the light emitted by the illumination system 100, 101 is constituted of a contribution of the spectrum of the light emitted by the LED D1, D2 emitting the spectrum of the further primary color blue 75 and the spectrum of the light emitted by the luminescent materials LuAGSN:Ce 73 and YAGSN:Ce 74, together emitting the primary color yellow. The shift (indicated with arrow 60) of the central wavelength of the further primary color blue 75 with respect to the primary color blue 72 is compensated by changing the concentration of the luminescent material YAGSN:Ce 74, resulting in an increased intensity (indicated with an arrow 62) of the optical power density spectrum of the luminescent material YAGSN:Ce 74. Thus, the optical power density spectrum 78b, when plotted in the u'v'-diagram of FIG. 4A, also results in the color point 78. Again, when altering the concentration of the individual luminescent materials LuAGSN:Ce 73 and YAGSN:Ce 74 within the luminescent layer 120, the contribution of the primary color yellow emitted by LuAGSN:Ce 73 and YAGSN:Ce 74 alters with respect to the further primary color blue 75 emitted by the LED D1, D2, which alters the optical power density spectrum 78b of the illumination system 100, 101 according to the invention and thus alters the color point 78 of the light emitted by the illumination system 100, 101.

It should be noted that the above-mentioned embodiments illustrate rather than limit the invention, and that those skilled in the art will be able to design many alternative embodiments without departing from the scope of the appended claims.

For example, the layer of luminescent materials need not necessarily be a continuous, flat layer, but may also consist of, for example, patches of luminescent material covering individual LEDs.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
   a light emitting diode for emitting light of a first primary color;
   a light exit window for emitting light from the illumination system; and
   a luminescent layer arranged between the light emitting diode and the light exit window for converting at least a part of the light emitted by the light emitting diode into light of a second primary color, the luminescent layer including one of
   1) a garnet luminescent material including Lutetium, Cerium, Silicon and Nitrogen enabling a shift of a center wavelength of the second primary color to increase a color temperature, or
   2) a combination of a garnet luminescent material including Lutetium and Cerium and a garnet luminescent material including Cerium and at least one of Yttrium and Gadolinium, the combination enabling tuning of
   a color point of the emitted light to correspond to a predefined value,
   correct for variations in a color filter, and
   the color temperature to be at a predefined level.

2. The illumination system as claimed in claim 1, wherein the garnet luminescent material comprises Gadolinium.

3. The illumination system as claimed in claim 1, wherein the garnet luminescent material including Lutetium, Cerium, Silicon and Nitrogen is represented by $(Y_{3-x-y}Lu_xGd_y)(Al_{5-z}Si_z)(O_{12-z}N_z):Ce$, where $0<x\leq3$, $0\leq y\leq2.7$, $0<x+y\leq3$ and $0<z\leq2$, the garnet luminescent material including Lutetium and Cerium is represented by $(Y_{3-x-y}Lu_xGd_y)(Al_{5-z}Si_z)(O_{12-z}N_z):Ce$, where $0<x\leq3$, $0\leq y\leq2.7$, $0<x+y\leq3$ and $0\leq z\leq2$, and the garnet luminescent material including Cerium and at least one of Yttrium and Gadolinium is represented by $(Y_{3-x-y}Lu_xGd_y)(Al_{5-z}Si_z)(O_{12-z}N_z):Ce$, where $0\leq x<3$, $0\leq y\leq2.7$, $0\leq x+y\leq3$ and $0\leq z\leq2$.

4. The illumination system as claimed in claim 1, the luminescent layer comprising a combination of two luminescent materials, wherein a molar concentration of a first of the two luminescent materials in the luminescent layer is 1 to 3 times larger than a molar concentration of a second of the two luminescent materials.

5. The illumination system as claimed in claim 1, the luminescent layer comprising a combination of two luminescent materials, wherein a variation of a central wavelength emitted by the light emitting diode is compensated by altering a molar concentration of at least one of the two luminescent materials.

6. The illumination system as claimed in claim 1, the luminescent layer comprising a combination of two luminescent materials, wherein the luminescent layer includes a layer of a first of the two luminescent materials and a further layer of a second of the two luminescent materials.

7. The illumination system as claimed in claim 1, the luminescent layer comprising a first garnet luminescent material including Lutetium, Cerium, Silicon and Nitrogen; and a second garnet luminescent material including Cerium, Silicon and Nitrogen and at least one of Yttrium and Gadolinium.

8. The illumination system as claimed in claim 1, wherein the luminescent layer is arranged as a remote phosphor layer arranged a distance away from the light emitting diode.

9. The illumination system as claimed in claim 1, comprising a light-mixing element arranged between the light emitting diode and the luminescent layer.

10. The illumination system as claimed in claim 1, comprising at least one of a reflective polarizer film and a collimator film arranged between the luminescent layer and the light exit window.

11. The illumination system as claimed in claim 1, wherein the light emitting diode comprises at least two light emitting diodes, an emission spectrum of each of the two light emitting diodes having a center wavelength such that the center wavelength of a first one of the two light emitting diodes is shifted at least 5 nanometers from the center wavelength of a second one of the two light emitting diodes.

12. The illumination system as claimed in claim 1, wherein the light emitting diode comprises at least two individually dimmable light emitting diodes.

13. The illumination system as claimed in claim 1, wherein the light emitting diode comprises a plurality of light emitting diodes that operate in a scanning mode of operation.

* * * * *